United States Patent [19]

Ohgami et al.

[11] Patent Number: 5,195,213
[45] Date of Patent: Mar. 23, 1993

[54] HINGE DEVICE FOR COUPLING ROTATABLE MEMBER TO ANOTHER MEMBER

[75] Inventors: Keizo Ohgami; Takashi Hosoi, both of Tokyo, Japan

[73] Assignee: Kabushiki Kaisha Toshiba, Kawasaki, Japan

[21] Appl. No.: 798,915

[22] Filed: Nov. 29, 1991

[30] Foreign Application Priority Data

Nov. 29, 1990 [JP] Japan .................. 2-333042

[51] Int. Cl.⁵ .............. E05C 17/64; E05D 11/10; E05D 5/10
[52] U.S. Cl. .................. 16/342; 16/321; 16/386
[58] Field of Search ............ 16/342, 321, 386

[56] References Cited

U.S. PATENT DOCUMENTS

| 673,000 | 4/1901 | Dyer | 16/342 |
| 1,805,324 | 5/1931 | Bird | 16/386 |
| 4,734,955 | 4/1988 | Connor | 16/342 |
| 5,052,078 | 10/1991 | Hosoi | 16/321 |

FOREIGN PATENT DOCUMENTS 63-23407 5/1988 Japan .

Primary Examiner—Robert L. Spruill
Assistant Examiner—Carmine Cuda
Attorney, Agent, or Firm—Cushman, Darby & Cushman

[57] ABSTRACT

A hinge device comprising a shaft, a coil spring, a shaft holder, and a bracket. The coil spring has a coiled portion wound around the main portion of the shaft. The shaft holder is secured to a first member and holds one end of the shaft, thus preventing the shaft from rotating. The bracket supports both end portions of the shaft, and is secured to a second member. The bracket, therefore, allows the first and second members to rotate relative to each other around the shaft. The main portion of the shaft has a cross section having a short diameter and a long diameter. The coiled portion is formed of a plurality of turns contacting one another. Each turn extends at a predetermined pitch angle to a line which extends at right angles to the axis of the shaft. The turn therefore looks elliptical when viewed in the axial direction, and has a short diameter greater than that of the main portion of said shaft, and a long diameter substantially equal to that of the main portion of said shaft. When the first and second members are rotated relative to each other around the shaft, the coiled portion is elastically deformed, changing the pitch angle and applying a frictional drag to the shaft. This drag suppresses the rotation of the first member or the second member.

13 Claims, 8 Drawing Sheets

HINGE DEVICE FOR COUPLING ROTATABLE MEMBER TO ANOTHER MEMBER

BACKGROUND OF THE INVENTION

1. Field of the Invention

The present invention relates to a hinge device for use in a laptop type or portable type computer, and more particularly to a hinge device which has spring and can hold the display unit of a portable computer at a desired angle in the open position.

2. Description of the Related Art

A portable computer comprises a base unit shaped like a rectangular box. The base unit has a keyboard. A flat-panel type display unit is connected to the base unit by a hinge device.

The hinge device couples the display unit to the base unit, such that the display unit can be rotated between the closed position and the open-up position. The hinge device has a mechanism which applies a frictional drag to the display unit, thereby holding the display unit at any desired angle in a position between the closed position and the open-up position.

Published Unexamined Japanese Patent Application No 59-99111 (Published Examined Japanese Patent Application No. 63-23407) discloses a hinge device for use in portable computers, which applies a mechanism which generates a frictional drag to a display unit. This device comprises a shaft and a coil spring wound around the the shaft. One end of the coil spring is secured to the shaft, and the other end of the spring is fastened the display unit of a portable computer. As the user of the portable computer rotates the display unit with hand in one direction around the shaft, the diameter of the coil spring decreases gradually. The coil spring therefore clamp the shaft with an increasing force. As a result, the hinge device applies an increasing fictional drag to the display unit. Once the frictional drag amounts to a specific value, the hinge device holds the display unit steadily even if the user of the computer takes his or her hand off the display unit.

To build up a frictional drag to apply to the display unit, the coil spring must fit onto the shaft tightly as the user rotates the display unit with hand. It is therefore required that the shaft and the coil spring have a precise outside diameter and a precise inside diameter, respectively. Hence, much time must be spent to machine the shaft, and to form the coil spring. Also it requires much time to assemble the hinge device. The hinge device is inevitably expensive.

SUMMARY OF THE INVENTION

The object of the invention is to provide a hinge device which comprises components not requiring precise machining and which can therefore be assembled easily and can be manufactured at low cost.

According to the invention, there is provided a hinge device for coupling a first member and a second member which are rotatable relative to each other, said hinge device comprising:

a shaft comprising a main portion having a cross section having a short diameter and a long diameter, and two end portions extending from to the ends of the main portion, respectively;

a coil spring comprising a coiled portion formed of a plurality of turns contacting one another and wound around the main portion of the shaft, and two arms extending from the ends of the coiled portion, each of said turns extending at a predetermined pitch angle to a line which extends at right angles to the axis of the shaft so that each turn looks elliptical when viewed in the axial direction and has a short diameter greater than that of the main portion of the shaft, and a long diameter substantially equal to that of the main portion of the shaft;

a bracket rotatable relative to said shaft, comprising two connecting portions secured to one of said first and second members, two bearing portions supporting the end portions of the shaft, respectively, and two coil-holding means holding the two arms of the coil spring, respectively; and a shaft holder secured to one of said first and second members, coupled to one of the end portions of the shaft, and preventing the shaft from rotating freely.

As the bracket rotates relative to the shaft in one direction, the pitch angle decreases, and the coiled portion of the coil is elastically deformed. As a result, the coiled portion exerts a restoring force until the pitch angle decreases to the initial value. The restoring force is less than the frictional force built up between the main portion of the shaft and the coiled portion of the coil spring as long as the coiled portion remains deformed elastically. This frictional force works as a drag, holding the first member at any desired angle in the open position.

For the purpose of applying such a frictional drag to the first member, the turns of the coiled portion wound around the main portion of the shaft extend at a predetermined pitch angle to a line which extends at right angles to the axis of the shaft, whereby each turn looks elliptical when viewed in the axial direction of the coiled portion. For the same purpose, the two coil-holding means of the bracket hold the two arms of the coil spring, respectively.

According to this invention, the shaft and the coil spring need not have a precise outside diameter and a precise inside diameter, respectively. Hence, it is easy to machine the shaft and to form the coil spring. In addition, the hinge device can easily be assembled. As a result, the hinge device can be manufactured at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
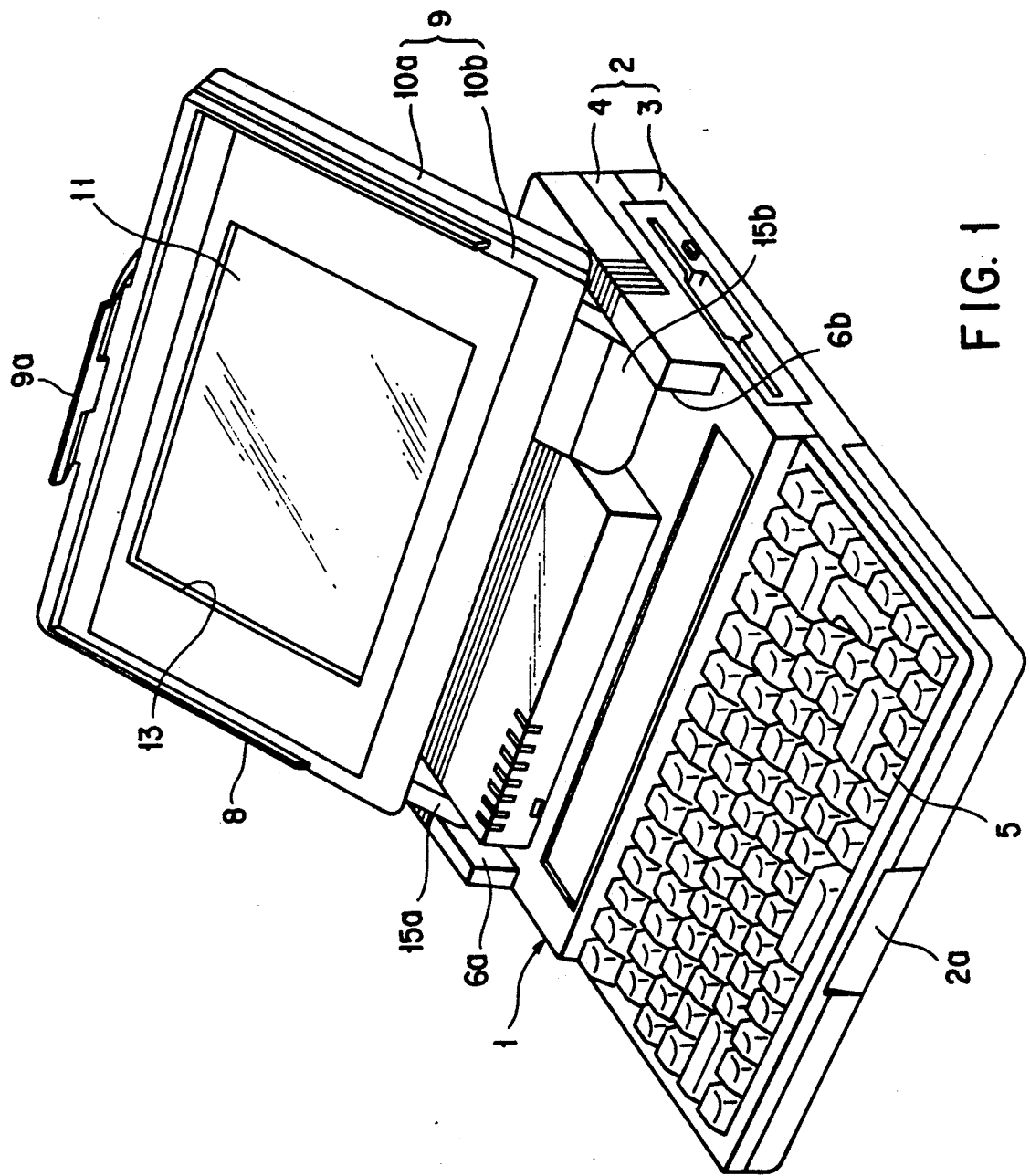
FIG. 1 is a perspective view showing a portable computer incorporating two identical hinge device according to a first embodiment of the invention.

FIG. 1 shows a portable type computer 1 which has a base unit 2. The base unit 2 is shaped like a shallow rectangular box, and consists of a bottom case 3 and a top cover 4. The bottom case 3 has an open top. The top cover 4 closes the open top of the bottom case 3.

The portable computer 1 further comprises a keyboard 5 and a flat-panel type display unit 8. The keyboard 5 is fitted in the front half of the base unit 2, and positioned such that the tops of its keys are lower then the upper surface of the rear half of the top cover 4. Two recesses 6a and 6b are formed in the two front corners of the rear half of the top cover 4. The display unit 8 comprises a housing 9, a liquid-crystal display 11 held in the housing 9, and two legs 15a and 15b protruding from the lower side of the housing 9. The housing 9 is formed of a base panel 10a and a front panel 10b having a rectangular window 13. The panels 10a and 10b are fastened together at four corners by means of screws (not shown), thus holding the display 11 sandwiched between these panels 10a and 10b. The display 11 is sandwiched between the panels 10a and 10b, and is exposed through the window 13 of the front panel 10b. Hence, the image displayed on the screen of the display 11 can be seen from outside.

The legs 15a and 15b of the display unit 8 are inserted in the recesses 6a and 6b, respectively. They are connected to the base unit 2 by hinge devices 22 and 23, respectively, such that the display unit 8 can be rotated between a closed position and an open-up position. (The hinge devices 22 and 23 will be described later, in detail.)

The display housing 9 is large enough to cover the keyboard 5 when it is rotated to the closed position. In the closed position, the housing 9 has its upper surface set flush with that of the top cover 4, and has its left and right sides placed flush with those of the top cover 4. While the display unit 8 remains in the closed position, the base unit 2 and the display unit 8 constitute a thin, compact, and portable box.

The display unit 8 has an elastic latch 9a. The latch 9a is put into engagement with a recess 2a made in the front side of the base unit 2 when the display unit 8 is rotated into the closed position. Once the latch 9a has been set in the recess 2a, the display unit 8 remains held in the closed position.

Figure 3:
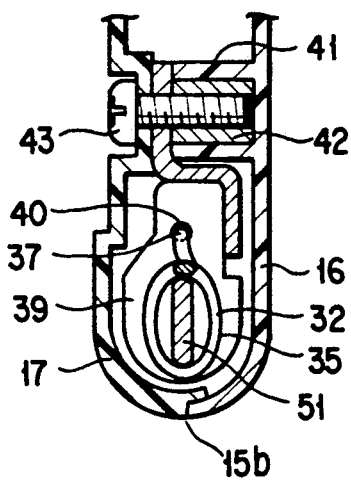
FIG. 3 is a cross-sectional view of one of the hinge devices, taken along line 1—1 in FIG. 2.

As may be understood from FIG. 1, the leg 15a of the display unit 8, which is inserted in the recess 6a, can rotate freely. As is shown in FIG. 3, the leg 15b, which is inserted in the recess 6b, is a hollow member consisting of a rear leg segment 16 and a front leg segment 17 which are fastened together. The rear leg segment 16 is integral with the base panel 10a, whereas the front leg segment 17 is integral with the front panel 10b. As is obvious from FIG. 1, the leg 15b is broader than the leg 15a.

Figure 2:
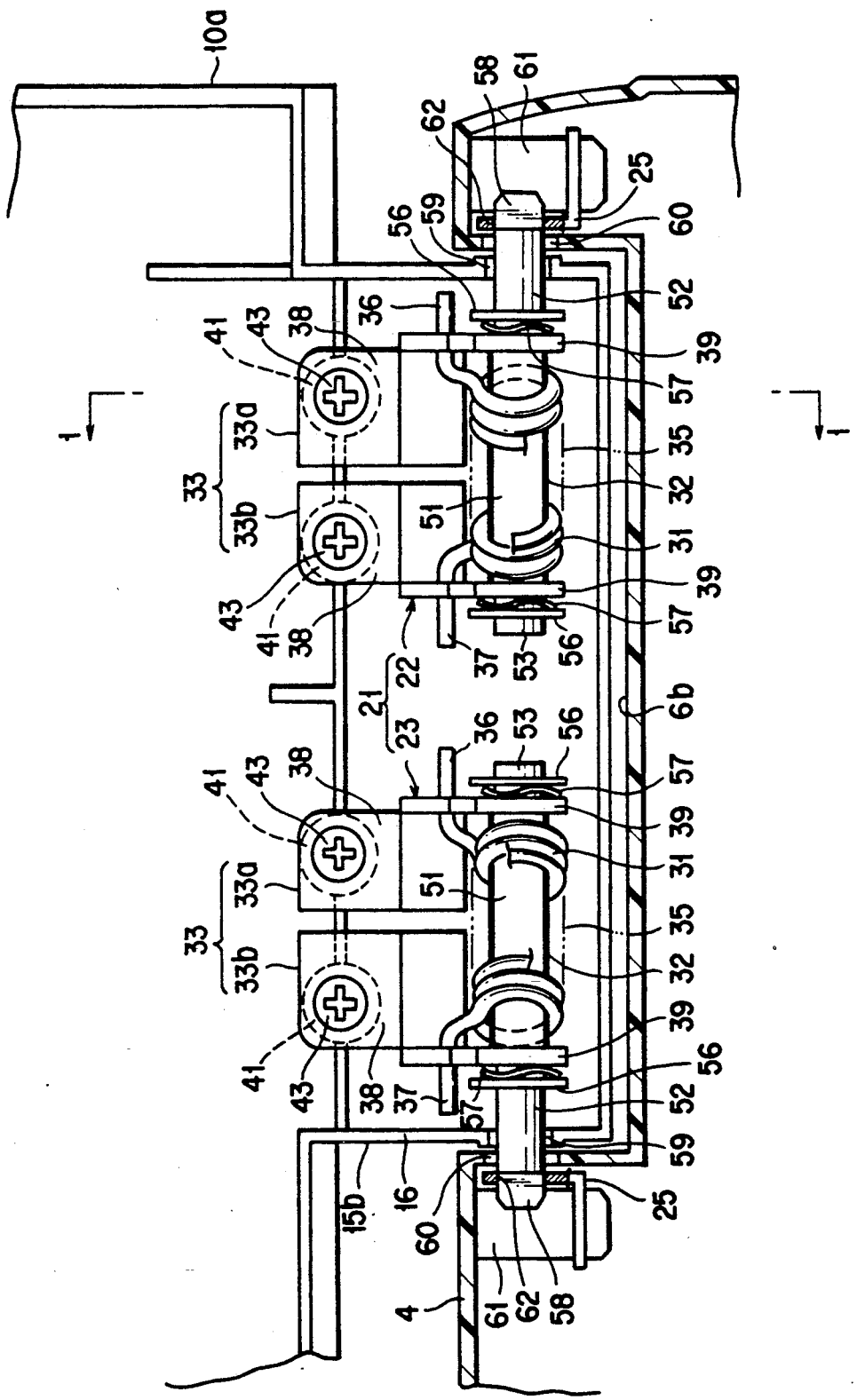
FIG. 2 is a sectional view of a part of the portable computer, showing the hinge devices in detail.

As is shown in FIG. 2, the leg 15b is rotatably connected to the base unit 2 by means of a hinge brake mechanism 21. The mechanism 21 comprises the first hinge device 22 and the second hinge device 23. These devices 22 and 23 are designed to apply a frictional drag to the leg 15b, thereby to hold the display unit 8 at any desired angle in the open position.

The first hinge device 22 will be described in detail. This device has a hinge unit and a shaft holder 25. The hinge unit is contained in the leg 15, and comprises a coil spring 31 and a shaft 32. The shaft holder 25 is secured to the base unit 2.

Figure 4:
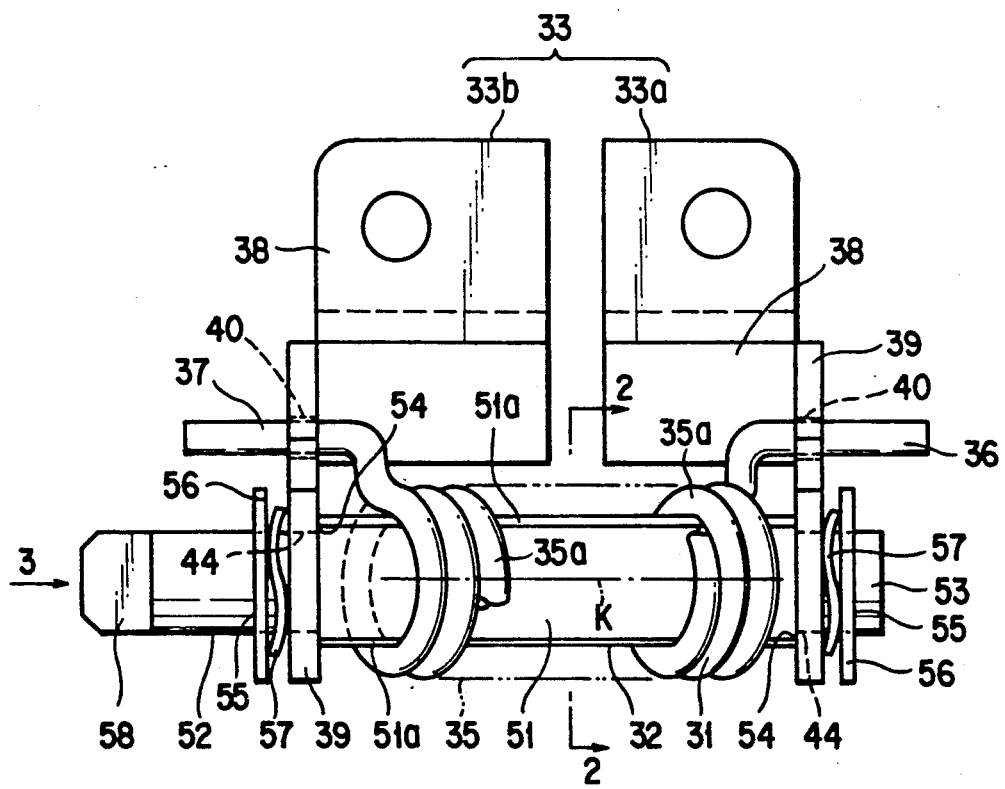
FIG. 4 is a front view showing the hinge unit of the hinge device shown in FIG. 2.
Figure 5:
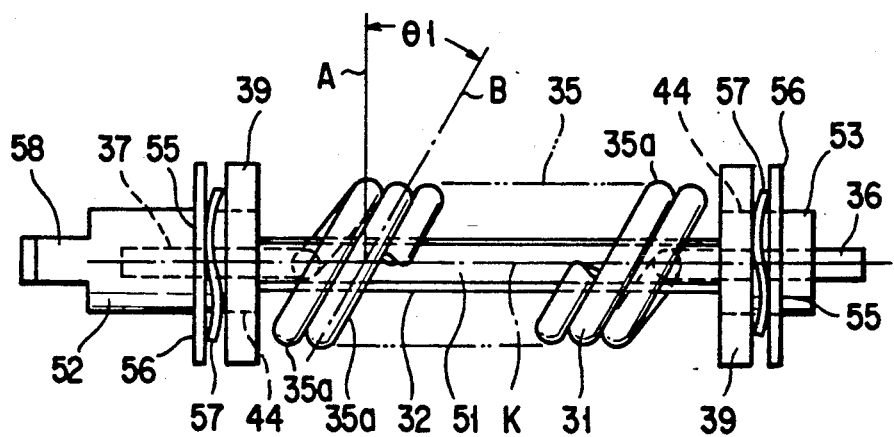
FIG. 5 shows the hinge unit viewed from below.

As is best shown in FIGS. 4 and 5, the coil spring 31 has a coiled portion 35 and two arms 36 and 37. The coiled portion 35 has an axis K, and is a formed spring made of an element wire and having turns 35a each contacting any adjacent turn. The arms 36 and 37 are integral with, and extend from, the ends of the coiled portion 35, respectively.

Figure 6:
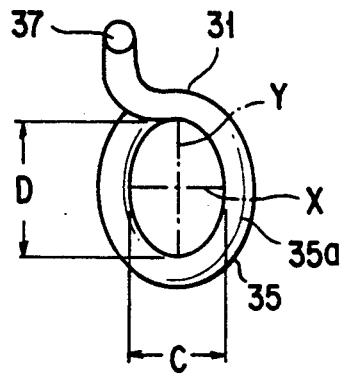
FIG. 6 is a side view of the coil spring of either hinge device shown in FIG. 2.

As is evident from FIG. 6, each turn 35a of the coiled portion 35 looks elliptical when viewed in the axial direction of the coiled portion 35. This is because each turn 35a extends, as is shown in FIG. 5, along line B which inclines at a pitch angle $\theta 1$ to line A extending at right angles to the axis of the coiled portion 35. The pitch angle $\theta 1$ is much greater than that of an ordinary coil spring whose turns are circular when viewed in the axial direction of the coil spring.

The coil spring 31 is formed in the following method. First, an element wire is wound around a rod (not shown), thus forming a coil whose turns contact one another and look circular when viewed in the axis direction of the coil and which has two arms 36 and 37. The coil, thus formed, is removed from the rod. Then, an external force is exerted to the coiled portion, thereby plastically deforming the coiled portion so that each turn inclines toward the axis of the coiled portion. As a result, each turn looks elliptical when viewed in the axial direction of the coiled portion. Finally, the coil, thus formed, is heat-treated, thereby forming the coil spring 31.

Both arms 36 and 37 of the coiled portion 35 are rods extending away from each other, in parallel to the axis of the coiled portion 35. The arms 36 and 37 are inserted in the through holes 40 of two shaft supports 39 (later described), and are long enough not to slip out of the holes 40 even when the coiled portion 35 is contracted in its axial direction, reducing the pitch angle $\theta 1$.

Figure 9:
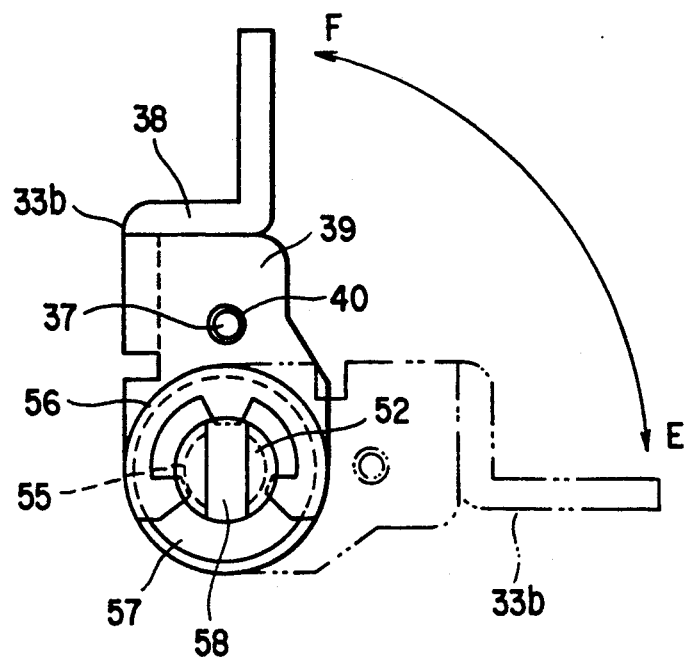
FIG. 9 shows the hinge unit viewed in the direction of arrow 3 shown in FIG. 4.

The shaft 32 is made of metal. It is supported by a bracket 33. The bracket 33 comprises a pair of bracket members 33a and 33b. As is shown in FIGS. 4 and 9, either bracket member has a connecting portion 38 and a shaft support 39. The support 39 is integral with the connecting portion 38, and has a through hole 40. According to the invention, the support 39 can have a notch or a projection, instead of the through hole 40.

As is shown in FIGS. 2 and 3, a pair of bosses 41 protrude from the inner surface of the rear leg segment 16 which is integral with the base panel 10a of the display unit 8. As is shown in FIG. 3, a nut 42 is formed in either bosses 41. Two screws 43 pass through two holes made in the front let segment 17, and also through the portions 38 of the bracket members 33a and 33b, and are set in engagement with the nuts 42. The the connecting portions 38 are thereby fastened to the bosses 41 of the rear leg segment 16 and, hence, to the base panel 10a of the display unit 8.

The shaft supports 39 of the bracket members 33a and 33b oppose each other. As is evident from FIGS. 4 and 9, either shaft support 39 has a through hole 44, in addition to the hole 40. The supports 39 are positioned such that their holes 44 are located coaxially.

The shaft 32 comprises a main portion 51 and two end portions 52 and 53 connected to, and integral with, the ends of the main portion 51, respectively. The main portion 51 is shaped like a strip. Either end portion is a circular rod having an annular groove 55, and has a diameter less than the width of the main portion 51. The junction between either end portion and the end of the main portion 51 defines a stepped portion 54.

The end portions 52 and 53 of the shaft 32 are inserted in the holes 44 of the shaft supports 39, respectively, and can rotate relative to each other. Thus, the leg 15b and, hence, the display unit 8, can be rotated around the shaft 32.

As is shown in FIG. 9, two E-shaped stop rings 56 are fitted in the annular grooves 55 of the end portions 52 and 53. Further, two wave washers 57 (either being a kind of a ring-shaped spring) are mounted on the end portions 52 and 53, each clamped between the shaft support 39 and the stop ring 56. Either wave washer 57 prevents the E-shaped stop ring 56 from slipping out of the annular groove 55. The stop rings 56 and the wave washers 57 cooperate to prevent the shaft 32 from slipping out of the shaft supports 39.

Interposed between the shaft support 39 and the stop ring 56, either wave washer 57 exerts a spring force to the shaft support 39, pushing the support 39 onto the stepped portion 54 of the shaft 32. A friction is generated between the support 39 and the washer 57. This friction acts as a frictional drag on the leg 15b of the display unit 8, holding the unit 8 at any desired angle in the open position.

The wave washers 57 can be replaced with spring members of any other type, such as belleville springs or spring washers, which exert a force on the shaft supports 39 in the axial direction of the shaft 32.

Figure 7:
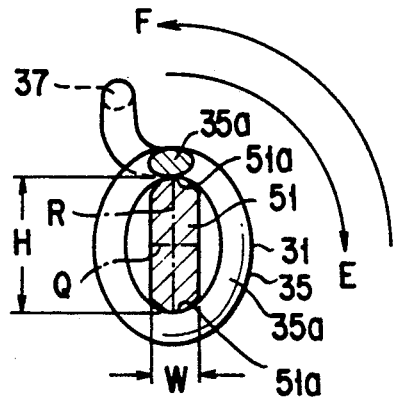
FIG. 7 is a cross-sectional view of the hinge unit, taken along line 2—2 in FIG. 4.

The main portion 51 of the shaft 32, which is integral with the end portions 52 and 52. The coiled portion 35 of the coil spring 31 is wound around the main portion 51. The main portion 51 has a non-circular cross section. As is best shown in FIG. 7, both sides 51a of the strip-shaped main portion 51 are rounded. Hence, the main portion 51 of the shaft 32 has a cross section which is substantially rectangular. This rectangular cross section has a specific relation with the elliptical cross section which the coiled portion 35 has when viewed in the axial direction of the coil spring 31.

More precisely, the cross section has a short diameter W (i.e., the length of the minor axis Q) which is less than that C (i.e., the length of the minor axis X) of the elliptical cross section of the coiled portion 35, and a long diameter H (i.e., the length of the major axis R) which is substantially equal to that D (i.e., the length of the major axis Y) of the elliptical cross section of the coiled portion 35. It should be noted that the rounded sides 31a of the main portion 51 contact the inner surface of the coiled portion 35.

As can be understood from FIG. 2, the end portion 53 of the shaft 32 passes through the hole 59 made in the leg 15b and also through the hole 60 made in that side wall of the top cover 4 which defines the right side of the recess 6b. The end portion 53 extends into the base unit 2. As is shown in FIGS. 2 and 8, a strip-shaped projection 58 protrudes from the end portion 53, in the axial direction thereof.

As is shown in FIG. 2, two bosses 61 are located in those portions of the top cover 4 which define the recess 6b between them. The shaft holder 25 is fastened to the right boss 61 by screws (not shown). The holder 25 opposes the hole 60 made in the side wall of the top cover 4b. The holder 25 has a rectangular hole 62. The projection 58 of the shaft 32 has a rectangular cross section which extends vertically and aligned with the elliptical cross section of the main portion 51 of the shaft 32. The projection 58 fitted in the rectangular hole 62 of the holder 25. The shaft 32 is thereby prevented from rotating.

Figure 8:
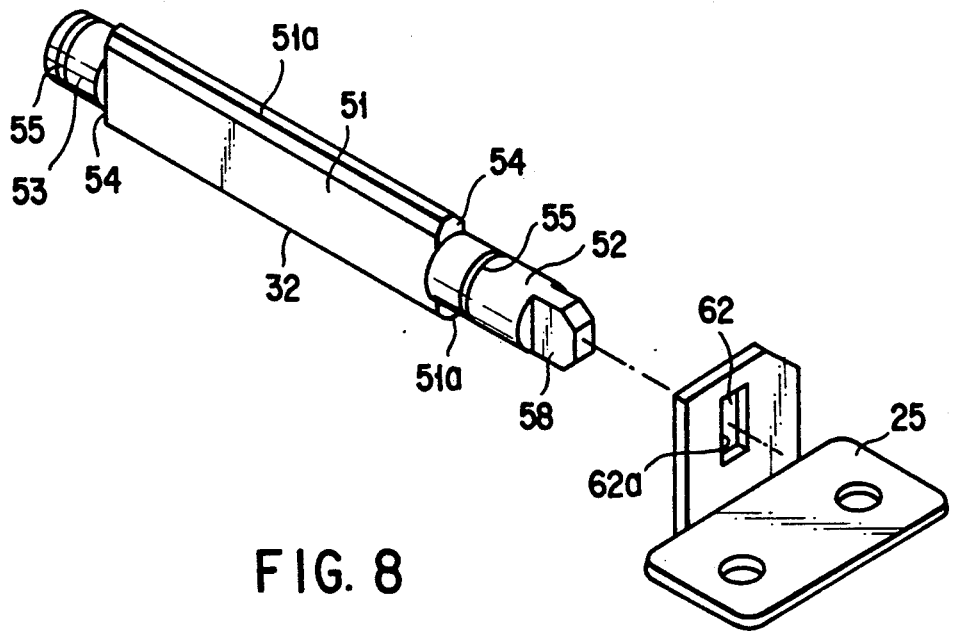
FIG. 8 is an exploded view showing the shaft and shaft holder of either hinge device shown in FIG. 2.

As is evident from FIG. 8, the rectangular hole 62 of the holder 25 extends in vertical direction. In other words, the long sides 62a of the hole 62 extend vertically. Hence, the shaft 32 is positioned such that the long diameter R of its main portion 51 extends in the vertical direction.

The second hinge device 23 has identical in structure to the first hinge device 22, except that its coil spring 31 is wound in the opposite direction. Therefore, the components identical to those of the hinge device 22 are denoted at the same reference numerals in FIG. 1, and will not be described.

It will now be explained how the hinge devices 22 and 23 operate in the portable computer 1.

When a user of the portable computer 1 rotates upwards the display unit 8 with his or her hand, from the closed position around the shafts 32 of both hinge devices 22 and 23, the brackets 33 of both hinge devices are rotated upwards, too, they are fastened to the base panel 10a. The user stops the display unit 8 at such a desired position that he or she can well see the data displayed on the screen of the liquid-crystal display 11.

Thereafter, even if the user takes his or her hand off the display unit 8, the hinge devices 22 and 23 hold the display unit 8 at that desired open position, or at any desired angle to the base unit 2, as will be explained in greater detail.

As the user rotates the display unit 8 upward from the closed position, the arms 36 and 37 of the coil spring 31 of either hinge device are rotated in the said direction of arrow F shown in FIG. 7. As a result, the coiled portion 35 of the spring 31 of the first hinge device 22 is tightened at the end coupled to the arm 36 and loosened at the end connected to the arm 37. At the same time, the coiled portion 35 of the spring 31 of the second hinge device 23 is loosened at the end connected to arm 36 and tightened at the end coupled to the arm 37.

Conversely, as the user rotates the display unit 8 downwards from any open position to the closed position, the brackets 33 of both hinge devices are rotated downwards, too, since the brackets 33 are fastened to the base panel 10a. The user stops the display unit 8 at the closed position, and takes his or her hand off the display unit 8. Thereafter, the hinge devices 22 and 23 hold the display unit 8 at that lower open position, as will be explained in greater detail.

As the user rotates the display unit 8 downwards from the open position, the arms 36 and 37 of the coil spring 31 of either hinge device are rotated in the direction of arrow E shown in FIG. 7. As a result, the coiled portion 35 of the spring 31 of the first hinge device 22 is loosened to the end coupled to the arm 36 and tightened at the end connected to the arm 37. At the same time, the coiled portion 35 of the spring 31 of the second hinge device 23 is tightened at the end connected to arm 36 and loosened at the end coupled to the arm 37.

The coiled portion 35 of the coil spring 31 are specifically positioned with respect to the shaft 32. More precisely, the major axis Y of its elliptical cross section is substantially aligned with the major axis R of the elliptical cross section of the main portion 51 of the shaft 32 when the display unit 8 is rotated upwards to the open-up position, and extends substantially at right angles to the major axis R when the display unit 8 is rotated downwards to the closed position.

Figure 10:
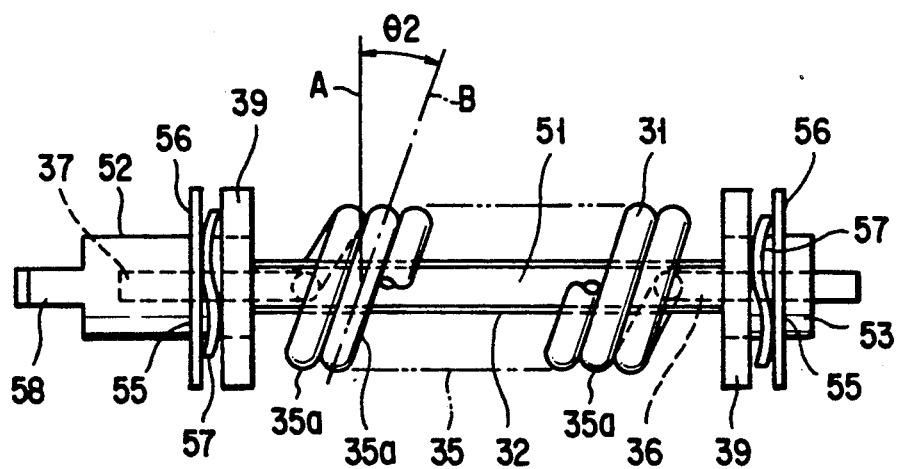
FIG. 10 shows the hinge unit exerting the maximum frictional drag.

Since the length H of the major axis Y of the elliptical cross section of the coiled portion 35 is greater than that C of the minor axis X thereof, that is, H>C, the main portion 51 of the shaft 32 gradually expands each turn of the coiled portion 35 as the display unit 8 is rotated toward the closed position. The turns of the coiled portion 35 are elastically expanded most to have an almost circular cross section when the unit 8 is in the closed position, with the pitch angle reduced to a minimum value $\theta 2$ as is shown in FIG. 10.

The rotational torque of the display unit 8 gradually increases as the unit 8 is rotated toward the closed position, due to the weight of the display unit 8. However, as the coiled portion 35 is elastically deformed, thus reducing the pitch angle, it generates a restoring force which tends to increase the pitch angle back to the initial value $\theta 1$.

This force functions as a brake force to the display unit 8, whereby the unit 8 can be held at any angle in an open position where the user has released the display unit 8. This drag becomes maximum when the display unit 8 is rotated downwards to the closed position, and becomes minimum when the unit 8 is rotated upwards by about 90° from the closed position.

As has been described, a frictional force is generated between each shaft support 39 and each wave washer 57 since the washer 57 is interposed and compressed between the shaft support 39 and the stop ring 56. This frictional force functions as an auxiliary drag, preventing the bracket 33 from rotating around the shaft 32. The frictional force is important when the display unit 8 is rotated upwards through 90° from the closed position, and the coil spring 31 exerts but a minimum drag on the display unit 8.

When the display unit 8 is set in the closed position, the coiled portion 35 of either hinge device is elastically deformed to the highest degree. Hence, as soon as the user releases the latch 9a from the recess 2a, the unit 8 is popped up by virtue of the restoring force of the coil spring 31.

As may be understood from the above, the drag which either hinge device exerts on the display unit 8, thereby to hold the unit 8 at any desired angle in the open position, is generated from the elastic deforming of the coil spring 31. The deforming of the coil spring 31 results from the changes in the positional relation between the coil spring 31 and the shaft 32. Therefore, the coil spring 31 and the shaft 32 need not have a precise inside diameter and a precise outside diameter, respectively. In addition, the drag generated by deforming the spring 31 is greater than a drag which ma be generated in the case where a hinge shaft 32 is fitted in a coil spring 31 whose inside diameter is substantially the same as the outside diameter of the hinge shaft 32.

Further, since the coil spring 31 and the shaft 32 need not have a precise inside diameter and a precise outside diameter, it is easy to machine the shaft 32 and to form the coil spring 31. For the same reason, the hinge devices 22 and 23 can easily be assembled.

The drag, which either hinge device exerts on the unit 8, thereby holding the unit 8 at any desired angle in the open position, depends on the pitch angle $\theta 1$ of the coiled portion 35 of the coil spring 31. Thus, the drag either hinge device exerts on the unit 8 can easily be changed to any other greater value, merely by replacing the coil spring 31 with a coil spring which is identical with the spring 31 in shape, size, the number of turns, but has a larger pitch angle.

FIGS. 11 to 15 show two identical hinge devices according to a second embodiment of the present invention. Either device is different from the hinge device according to the first embodiment, only in connection with three components, i.e., a bracket 133, a shaft 132, and a shaft holder 125.

Figure 11:
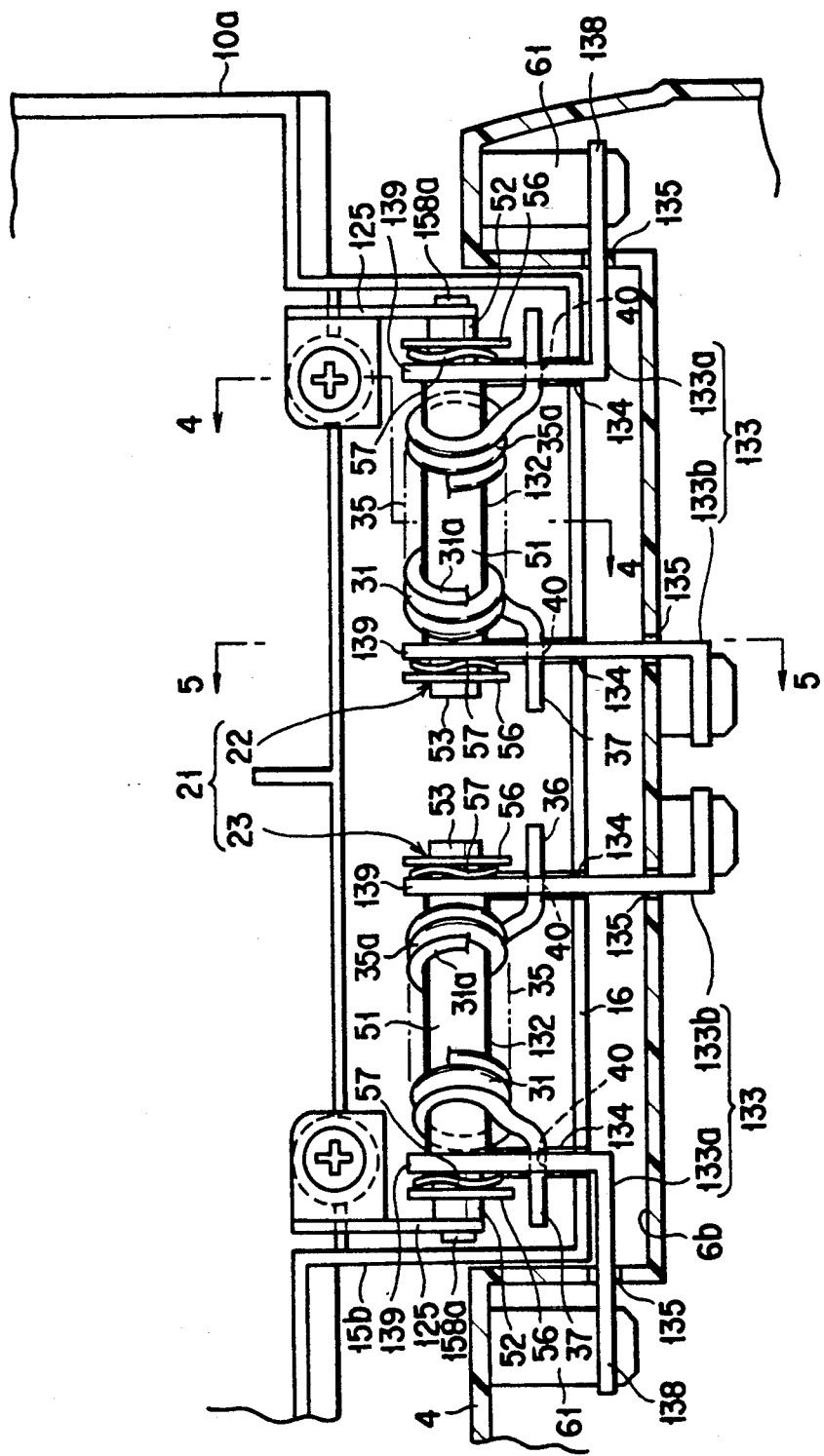
FIG. 11 is a sectional view of a part of a portable computer, showing the two identical hinge devices incorporated in the computer, which are a second embodiment of the present invention.
Figure 12:
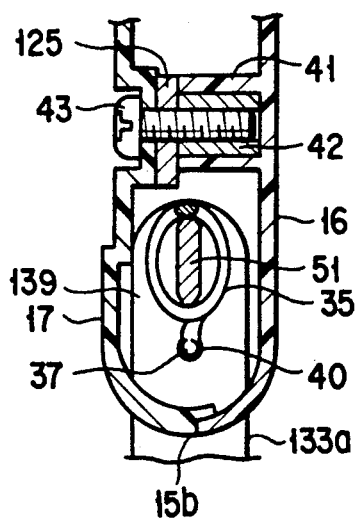
FIG. 12 is a cross-sectional view showing one of the hinge devices, taken along line 4—4 in FIG. 11.
Figure 13:
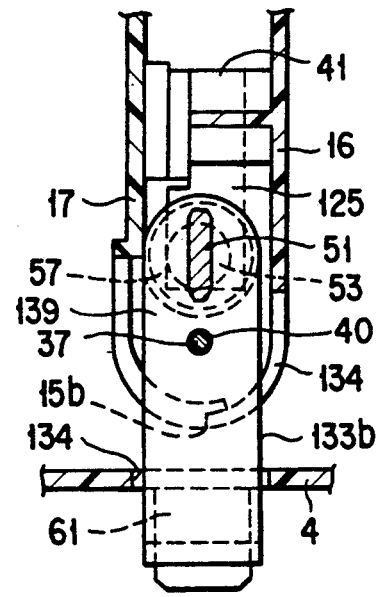
FIG. 13 is a cross-sectional view of the hinge device shown in FIG. 12, taken along line 5—5 in FIG. 11.

More specifically, the bracket 133 is fastened to the base unit 2 of a portable computer, not to the display unit 8. As is shown in FIG. 11, the bracket 133 comprises a pair of bracket members 133a and 133b. Either bracket member has a connecting portion 138 and a shaft support 139. The support 139 is integral with the connecting portion 138, and has a through hole 40. The supports 139 of the bracket members 133a and 133b extend into the leg 15b of the unit 8 through two slits 134 made in the leg 15b. The upper ends of the supports 139 support the end portions 52 and 53 of a shaft 32. The lower ends of the bracket members 133a and 133b are inserted in two slits 135 made in the side and bottom of the base unit 2, respectively.

Figure 14:
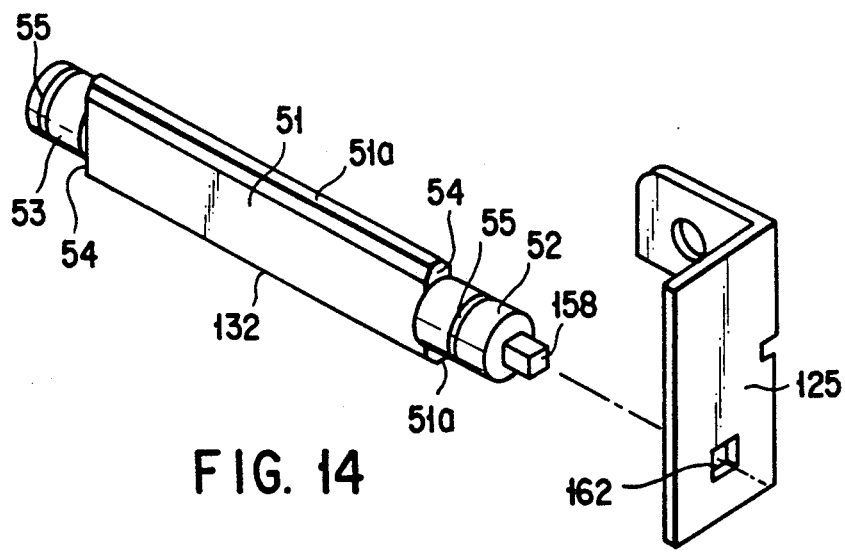
FIG. 14 is an exploded view showing the shaft and shaft holder of either hinge device shown in FIG. 11.
Figure 15:
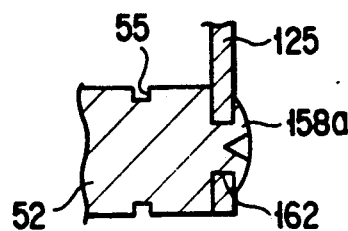
FIG. 15 is a cross-sectional view, illustrating how the shaft is coupled to the shaft holder.

The shaft 132 has a projection 158 which has, as is shown in FIG. 14, a square cross section, not a rectangular cross section as does the projection 158. The shaft holder 125 is fastened to the display unit 8 by a screw, not to the base unit 2. As is shown in FIG. 11, the shaft holder 125 holds one end of the shaft 132. As can be understood from FIG. 14, the projection 158 is fitted in the square hole 162 of the shaft holder 125. As is shown in FIG. 15, the tip 158a of the projection 158, which protrudes from the holder 125 is caulked, and the shaft 132 cannot be disconnected from the shaft holder 125.

The hinge device according to the second embodiment operates in the same way as the hinge device according to the first embodiment, except for two points. First, the shaft 32 is rotated, whereas the coil spring 31 is not rotated. Second, the shaft 32 is rotated when the display unit 8 is rotated.

Figure 16:
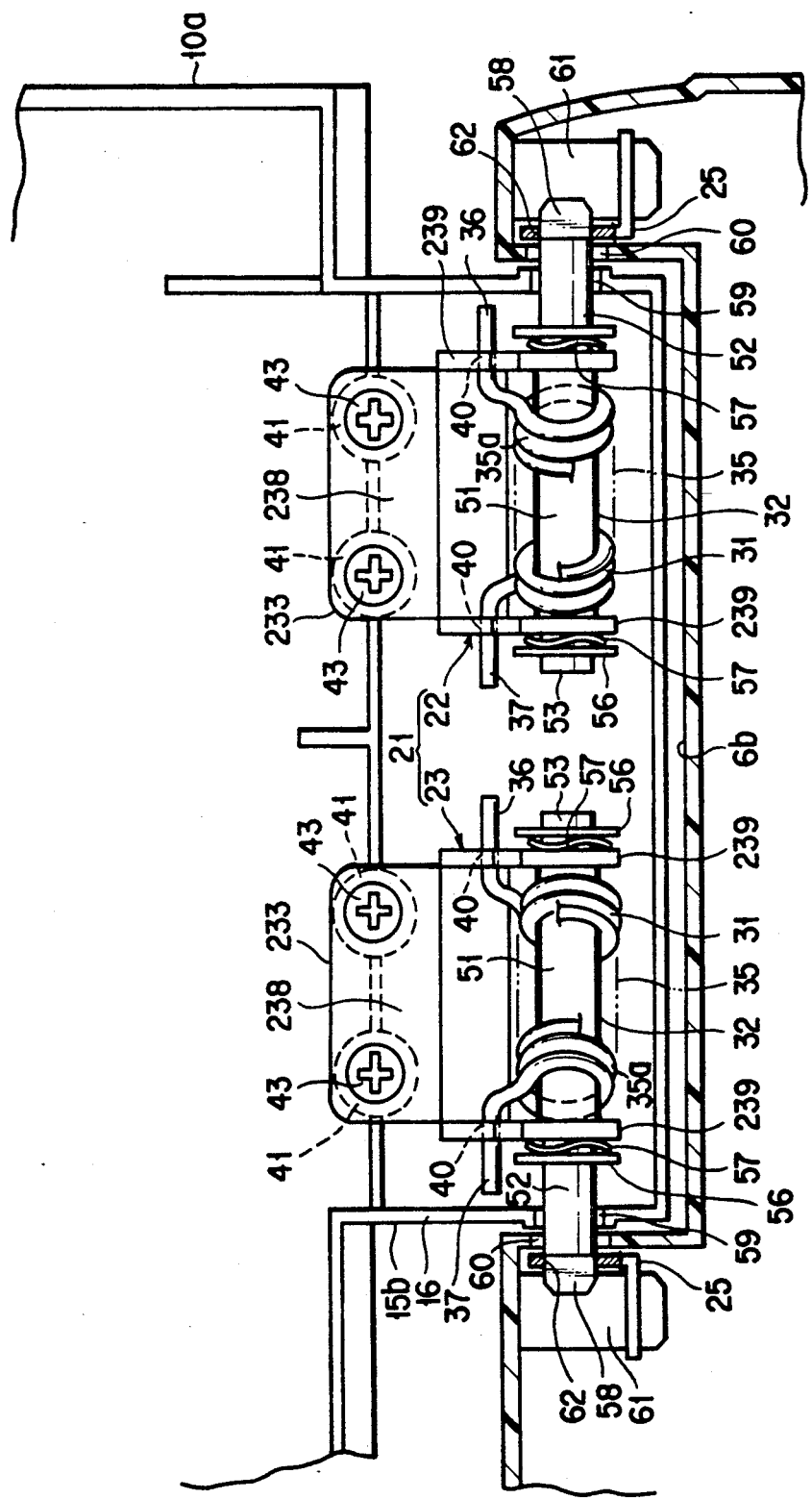
FIG. 16 is a sectional view of a part of a portable computer, showing the two identical hinge devices incorporated in the computer, which are a third embodiment of the present invention.

FIG. 16 shows two identical hinge devices according to a third embodiment of the invention. Either device is different from the hinge device according to the first embodiment, only in that use is made of a one-piece bracket 233, not a two-piece one like the bracket 33 which consists of two members 33a and 33b. The bracket 233 has two shaft supports 239, each having a through hole 40.

The various hinge devices according to this invention can be used not only in portable computers, but also in other apparatuses such as word processors and the reclining mechanisms of seats.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A hinge device for coupling a first member and a second member which are rotatable relative to each other, said hinge device comprising:
   a shaft comprising a main portion having a cross section having a short diameter and a long diameter, and two end portions extending from the ends of the main portion, respectively;
   a coil spring wound around the main portion of said shaft and comprising a coiled portion formed of a plurality of turns contacting one another, and two arms extending from the ends of the coiled portion, each of said turns extending at a predetermined pitch angle to a line which extends at right angles to the axis of said shaft so that each turn looks elliptical when viewed in the axial direction and has a short diameter greater than that of the main portion of said shaft, and a long diameter substantially equal to that of the main portion of said shaft;
   a bracket rotatable relative to said shaft, comprising two connecting portions secured to one of said first and second members, two bearing portions supporting the end portions of said shaft, respectively, and two coil-holding means holding the two arms of the said coil spring, respectively; and
   a shaft holder secured to one of said first and second members, coupled to one of the end portions of said shaft, and preventing said shaft from rotating freely.

2. A hinge device according to claim 1, wherein said bracket is secured to the second member which is rotatable, and said shaft holder is secured to the first member.

3. A hinge device according to claim 1, wherein said bracket is secured to the first member, and said shaft holder is secured to the second member which is rotatable.

4. A hinge device according to claim 1, wherein the arms of said coil spring are shaped like a rod, the coil-holding means of said bracket have a through hole each, and said arms are movably inserted in the through holes of said coil-holding means, respectively.

5. A hinge device according to claim 1, wherein said bracket comprises a pair of bracket members each having one of said coil-holding means and secured to one of said connecting portion.

6. A hinge device according to claim 1, wherein said bracket comprises a pair of bracket members each comprising one of said bearing portions, one of said coil-holding means and a connecting portion secured to one of said first and second members.

7. A hinge device according to claim 1, wherein said shaft has two stepped portions, one located between said main portion and one of said end portions, and the other located between said main portion and the other of said end portions, and which further comprises a stop ring fastened to at least one of said end portions, and at least one ring-shaped spring clamped between said stop ring and one of said bearing portions, for applying a force in the axial direction of said shaft.

8. A hinge device according to claim 7, wherein said ring-shaped spring is a wave washer.

9. A hinge brake mechanism for coupling a first member and a second member which are rotatable relative to each other, said mechanism comprising:
   a first hinge device comprising:
      a shaft comprising a main portion having a cross section having a short diameter and a long diameter, and two end portions extending from the ends of the main portion, respectively;
      a coil spring comprising a coiled portion formed of a plurality of turns contacting one another and wound around the main portion of said shaft, and two arms extending from the ends of the coiled portion, each of said turns extending at a predetermined pitch angle to a line which extends at right angles to the axis of said shaft so that each turn looks elliptical when viewed in the axial direction and has a short diameter greater than that of the main portion of said shaft, and a long diameter substantially equal to that of the main portion of said shaft;
      a bracket rotatable relative to said shaft, comprising two connecting portions secured to one of said first and second members, two bearing portions supporting the end portions of said shaft, respectively, and two coil-holding means holding the two arms of the said coil spring, respectively; and
      a shaft holder secured to one of said first and second members, coupled to one of the end portions of said shaft, and preventing said shaft from rotating freely; and
   a second hinge device spaced away from said first hinge device and comprises:
      a shaft comprising a main portion having a cross section having a short diameter and a long diameter, and two end portions extending from the ends of the main portion, respectively;
      a coil spring comprising a coiled portion formed of a plurality of turns contacting one another and wound around the main portion of said shaft in a direction opposite to the direction in which the coil spring of said first hinge device is wound around the main portion of the shaft of said second hinge device, and two arms extending from the ends of the coiled portion, each of said turns extending at a predetermined pitch angle to a line which extends at right angles to the axis of said shaft so that each turn looks elliptical when viewed in the axial direction and has a short diameter greater than that of the main portion of said shaft, and a long diameter substantially equal to that of the main portion of said shaft;
      a bracket rotatable relative to said shaft, comprising two connecting portions secured to said one of said first and second members, two bearing portions supporting the end portions of said shaft, respectively, and two coil-holding means holding the two arms of the said coil spring, respectively; and a shaft holder secured to one of said first and second members, coupled to one of the end portions of said shaft, and preventing said shaft from rotating freely.

10. A portable computer comprising:

a base unit having a keyboard;

a display unit; and a hinge device coupling said display unit to said base unit, such that said display unit can be rotated from a closed position where said display unit covers said keyboard to an open position where said display unit allows an access to said keyboard, said hinge device comprising:

a shaft comprising a main portion having a cross section having a short diameter and a long diameter, and two end portions extending from the ends of the main portion, respectively;

a coil spring wound around the main portion of said shaft and comprising a coiled portion formed of a plurality of turns contacting one another, and two arms extending from the ends of the coiled portion, each of said turns extending at a predetermined pitch angle to a line which extends at right angles to the axis of said shaft so that each turn looks elliptical when viewed in the axial direction and has a short diameter greater than that of the main portion of said shaft, and a long diameter substantially equal to that of the main portion of said shaft;

a bracket rotatable relative to said shaft, comprising two connecting portions secured to one of said base unit and said display unit, two bearing portions supporting the end portions of said shaft, respectively, and two coil-holding means holding the two arms of the said coil spring, respectively; and a shaft holder secured to said one of said base unit and said display unit, coupled to one of the end portions of said shaft, and preventing said shaft from rotating freely.

11. A portable computer according to claim 10, wherein said bracket is secured to said display unit, and said shaft holder is secured to said base unit.

12. A portable computer according to claim 11, wherein the long diameter of the main portion of said shaft extends vertically at right angles to the axis of said shaft, and the long diameter of said coiled portion extends substantially at right angles to the long diameter of the main portion of said shaft when said display unit is set at the closed position, and is substantially aligned with the long diameter of the main portion of said shaft when said display unit is set at the open position.

13. A portable computer according to claim 12, wherein said shaft has two stepped portions, one located between said main portion and one of said end portions, and the other located between said main portion and the other of said end portions, and which further comprises a stop ring secured to at least one of said end portions, and at least one ring-shaped spring clamped between said stop ring and one of said bearing portions.

* * * * *